J. TURNER.
Treating Offal and Manufacturing Gas.
No. 5,845. Reissued April 21, 1874.
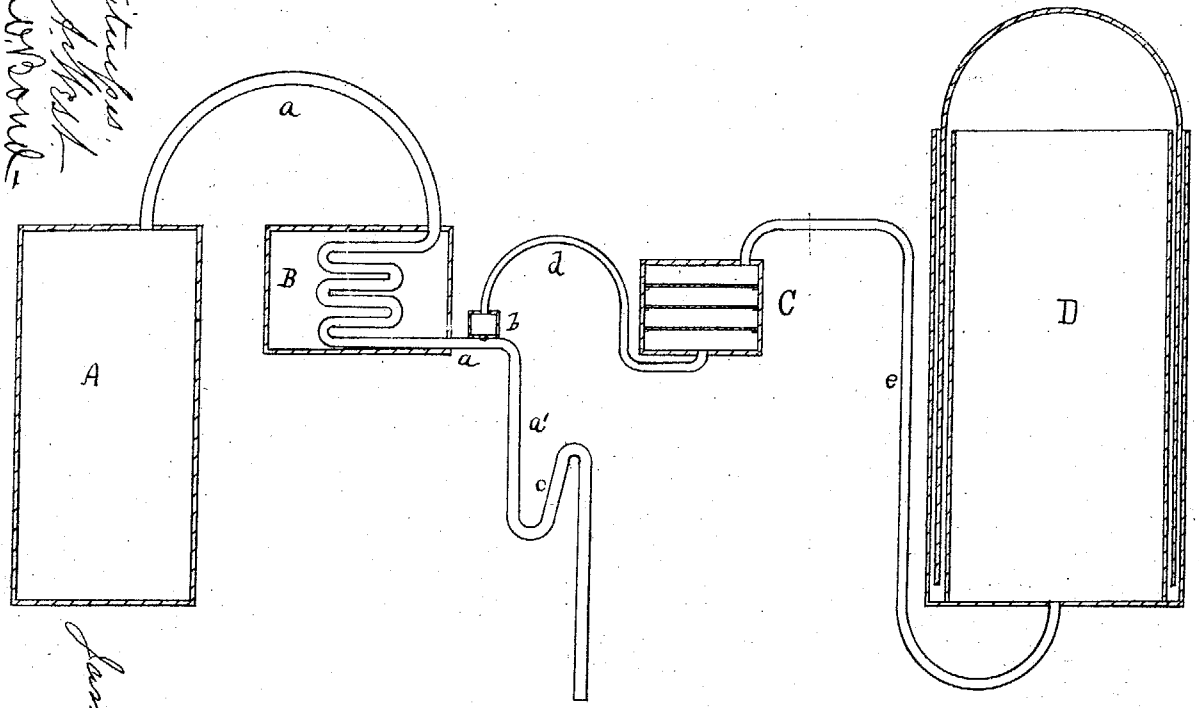
Witnesses.
E. A. West
C. W. Bond
James Turner
Inventor

UNITED STATES PATENT OFFICE.

JAMES TURNER, OF CHICAGO, ILLINOIS.

IMPROVEMENT IN TREATING OFFAL AND MANUFACTURING GAS.

Specification forming part of Letters Patent No. 140,391, dated July 1, 1873; reissue No. 5,845, dated April 21, 1874; application filed November 10, 1873.

*To all whom it may concern:*

Be it known that I, JAMES TURNER, of Chicago, Cook County, Illinois, have invented or discovered a new and useful mode of disposing of or suppressing the offensive odors which arise from rendering animal substances and treating offal, at the same time utilizing the gases which are formed by the process; and the following is a full, clear, and exact description of my improvement, reference being had to the accompanying drawing, which represents one form of devices which may be used in accomplishing the desired result, in connection with an ordinary tank or receptacle; and My invention consists in a mode of suppressing the offensive odors arising from rendering or treating animal substances, and utilizing the gases therefrom, by separating the gases from the moisture and carbureting the same, as hereinafter more fully described.

In the drawings the several parts, except the tubes, are shown in section.

A represents a steam rendering-tank, or other suitable receptacle for the substance to be treated, about twelve feet deep and six feet in diameter, constructed in the usual manner. B is a condenser containing water, and may be about four feet deep and six feet square. C is a purifier, which may be about three feet deep and four feet square. D is a gasometer, which is to be of any suitable size, depending on the quantity of gas to be stored therein.

In the construction of these parts there is nothing novel.

From the top of the tank A a tube, *a*, passes through the condenser B, being coiled therein. After leaving the condenser this tube *a* may be carried down to a sewer, and provided with a trap, *c*, which has sufficient capacity to prevent any material portion of the gas from escaping with the water of condensation, which is liable as the offal is treated under pressure, in which event said pressure is as liable to force the gas through the pipe *a* as the pipe *d*, were it not for the column of water held in the trap *c*.

The moisture, gases, and other volatile matters which are formed while the substances in A are being rendered or treated, pass into the tube *a*, and through or into the coil in the condenser, and there the moisture is condensed and passes off through the tube *a'*; but the gas, the moisture having been separated therefrom, will pass into the tube *d*, and be conducted into the purifier C, and from this purifier, through the pipe or tube *d*, will be conveyed into the gasometer, in which should be constantly stored a quantity of gasoline or other suitable carbureting material; and the gas passing up through the gasoline becomes carbureted and suitable for illuminating purposes; and if not wanted for this purpose it can be conveyed to the furnace and consumed.

Lime or other suitable material is to be used in the purifier for absorbing or extracting the carbonic-acid gas.

For the purpose of preventing moisture from being forced into and through the tube *d*, I use a small close chamber, *b*, into which the gas first passes from *a*, the tube *d* entering at the top of *b*. If the tube *d* were large this would not be necessary.

For ordinary uses the tube *a* may be an inch and a half or two inches in diameter, and *d* may be from one inch to one inch and a half in diameter; but larger sizes may be used. The condenser may be open at the top.

For illuminating purposes, the gas should be thoroughly distributed through the gasoline, and to effect this may be introduced through a number of small perforations.

When the moisture has been separated from these gases, they can be burned in a fire without being carbureted; but in this condition they are valueless for illuminating purposes, and have but little value for heating purposes; hence, it is better to complete the process as described, and utilize the gases more perfectly.

The water of condensation is not entirely odorless, but nearly so, and having been cooled will not be offensive.

Nearly all of the odors are stored up in the gases, and when these escape into the air they are carried great distances and the odors are very offensive.

By my process these odors are suppressed and destroyed, no odor arising from the combustion; at the same time the gases which have heretofore been wasted, and are large in quantities, can be rendered valuable.

What I claim as new is as follows:

The mode herein described of suppressing the offensive odors arising from rendering or treating animal substances, and utilizing the gases therefrom, by separating the gases from the moisture and carbureting the same, substantially as specified.

JAMES TURNER.

Witnesses:
E. A. WEST,
O. W. BOND.